United States Patent [19]

Bishop et al.

[11] Patent Number: 5,043,841
[45] Date of Patent: Aug. 27, 1991

[54] HIGH PRESSURE TRANSDUCER PACKAGE

[76] Inventors: Robert P. Bishop, 7 Bisbee Dr., Carver, Mass. 02330; Herman Purut, 110 Brook Haven Dr. #4, Attleboro, Mass. 02703; Richard J. Trottier, 5 Empire Cir., Bellingham, Mass. 02019

[21] Appl. No.: 366,045

[22] Filed: Jun. 13, 1989

[51] Int. Cl.$^5$ .............. G01L 9/12; H01G 7/00
[52] U.S. Cl. ........................ 361/283; 73/718
[58] Field of Search ............ 361/280, 283; 73/718, 73/724

[56] References Cited

U.S. PATENT DOCUMENTS 4,414,851 11/1983 Maglic ................... 73/724 X
4,425,799 1/1984 Park .................... 361/283 X

FOREIGN PATENT DOCUMENTS 13235 1/1985 Japan ..................... 73/718

Primary Examiner—Donald A. Griffin

[57] ABSTRACT

A high pressure transducer package wherein pressures and stresses encountered within the package interior are substantially lowered. In a first embodiment, total inlet pressure is applied against a transfer pin in the fluid inlet which transfers this pressure at its other end directly against a pressure sensing element. This lowers the forces transmitted through the package by the sensing element. In a second embodiment, inlet fluid impinges against the small area end of a transfer pin having an opposite large area end to transfer pressure to the pressure transducer either as above or via an enclosed liquid disposed between the large area end of the piston and the pressure transducer. This causes a reduction in the pressure applied to the pressure transducer. The liquid provides for uniform application of the pressure from the piston to the pressure transducer along the entire area of contact therewith. In a third embodiment, inlet fluid impinges against a constant diameter transfer pin. The other end of the pin is positioned against a diaphragm having substantially larger surface area than the pin and a flowable material unaffected by the pressures involved is positioned in an enclosure between the diaphragm and the pressure transducer. This materially lowers the pressures encountered within the package, the flowable material providing for uniform application of the pressure along the entire diaphragm area.

19 Claims, 4 Drawing Sheets

HIGH PRESSURE TRANSDUCER PACKAGE

CROSS REFERENCE TO RELATED APPLICATION

This application is related to application Ser. No. 07/282,185, filed Dec. 8, 1988 for HIGH PRESSURE PACKAGE FOR PRESSURE TRANSDUCERS of Robert P. Bishop, which issued on Dec. 19, 1989, as U.S. Pat. No. 4,888,662, the contents of which are incorporated herein by reference.

BACKGROUND OF THE INVENTION

1. Field of the Invention

This invention relates to a packaging technique for pressure transducers and, more specifically, to such packaging for pressure transducers capable of measuring high pressures in the range of up to about 5000 psi.

2. Brief Description of the Prior Art

Pressure sensors containing pressure transducers are well known, typical such systems being described in U.S Pat. Nos. 4,726,492 and 4,774,626.

Pressure transducers of the prior art have generally been fabricated by providing a pressure sensing module including an electronic circuit having a variable capacitor responsive to fluid pressure. The electronic circuit sensed the capacitance of the capacitor and provided an output through a plastic electrical connector indicative of the sensed pressure. The transducer elements were arranged such that a metal cup assembly having an opening or fluid pressure inlet at one end thereof to receive the fluid under pressure to be measured also included therein the pressure sensing module. The pressure sensing module was spaced from the inlet by a gasket or O-ring, the electronic circuit and connector also being contained within the metal cup. The parts were held together within the metal cup by crimping the metal cup over the plastic connector, the latter being used as a support member.

The above described pressure transducer provided highly satisfactory results when operated in the low to moderate pressure ranges of up to 500 to 600 psi. However, when subjected to pressures at the pressure inlet in the range of about 3000 to 5000 psi and up, the above described pressure transducers tended to fail. There were several points of failure, these being mainly from the inability of the plastic connector to support the high pressures to which it was being subjected. More specifically, the crimp at the metal cup was unable to retain the electrical connector crimped thereunder with the result that the connector was moved out of the cup and caused a failure of the transducer. A further point of failure was the plastic connector itself which tended to shear or compress and release the gasket or O-ring under the high pressure and release the fluid under pressure from the interior of the pressure transducer. It is therefore clear that the prior art pressure transducer of the type described hereinabove was incapable of reliable operation in a high pressure environment.

The above described problem of the prior art was materially improved in accordance with the the packaging techniques described in the above mentioned Ser. No. 07/282,185, filed Dec. 8, 1988 wherein the pressure sensing element is isolated from the connector by being disposed in an all metal surrounded cavity whereby the plastic connector is separated from the pressure transducer element and is not bearing the loads produced by the high pressure fluid. This is accomplished by a metal member disposed between the pressure sensing element and the plastic connector whereby the high pressures encountered by the pressure transducer are never applied to the plastic connector. However, though the pressure transducers of this application provide highly satisfactory results, there remains the problem that the internal pressures within the transducer are equal to the applied high pressure to be measured. This places all structural members of the package as well as the seal mechanism in a highly stressed state. It is therefore apparent that any diminution of the stresses applied within the package will result in improved transducer life and will materially relieve those problems caused by such internal stresses which have previously been minimized by costly design measures.

SUMMARY OF THE INVENTION

In accordance with the present invention, the above described problem of the prior art is materially minimized and there is provided a high pressure transducer package wherein the pressures and stresses encountered within the package interior are substantially lower than those encountered in the above described prior art.

Briefly, the above is accomplished, in accordance with a first embodiment of the invention, by providing a piston or transfer pin in the fluid inlet wherein the total inlet pressure is applied against one end of the pin. The other end of the pin impinges against the pressure sensing element to transfer the pressure of the inlet fluid thereto. However, since the inlet fluid does not reach the interior of the package, no pressure or stress therefrom is applied to the package or sealing elements within the package. The geometry is such that lower forces are transmitted throughout the package by the sensing element.

In accordance with a second embodiment of the invention, again, a piston or transfer pin is placed in the fluid inlet whereby the inlet fluid impinges against one end thereof. This pressure is transferred to the pressure transducer either as in the first embodiment or via a liquid disposed between the opposing end of the piston and the pressure transducer. In addition, the piston in this embodiment has a larger diameter at the end thereof contacting either the pressure transducer or the liquid than it has at the end thereof contacting the inlet fluid. This causes a reduction in the pressure within the package and in the pressure applied to the pressure transducer since the latter pressure is applied over a larger area. The liquid provides for uniform application of the pressure from the piston to the pressure transducer along the entire area of contact therewith.

In accordance with a third embodiment of the invention, a constant diameter piston or transfer pin is placed in the fluid inlet with inlet fluid impinging on one end thereof. The other end of the piston is positioned against a diaphragm having a substantially larger surface area than either end of the piston. A silicone gel, elastomer or other flowable material which is unaffected by the pressures involved is positioned between the diaphragm and the pressure transducer and retained thereat by a back-up ring or seal which forms an enclosure with the diaphragm and the pressure transducer. In this manner, the pressures encountered within the package are materially lower than the pressure at the package inlet, the flowable material providing for uniform application of the pressure from the diaphragm along the entire area thereof.

DESCRIPTION OF THE PREFERRED EMBODIMENTS

Figure 1:
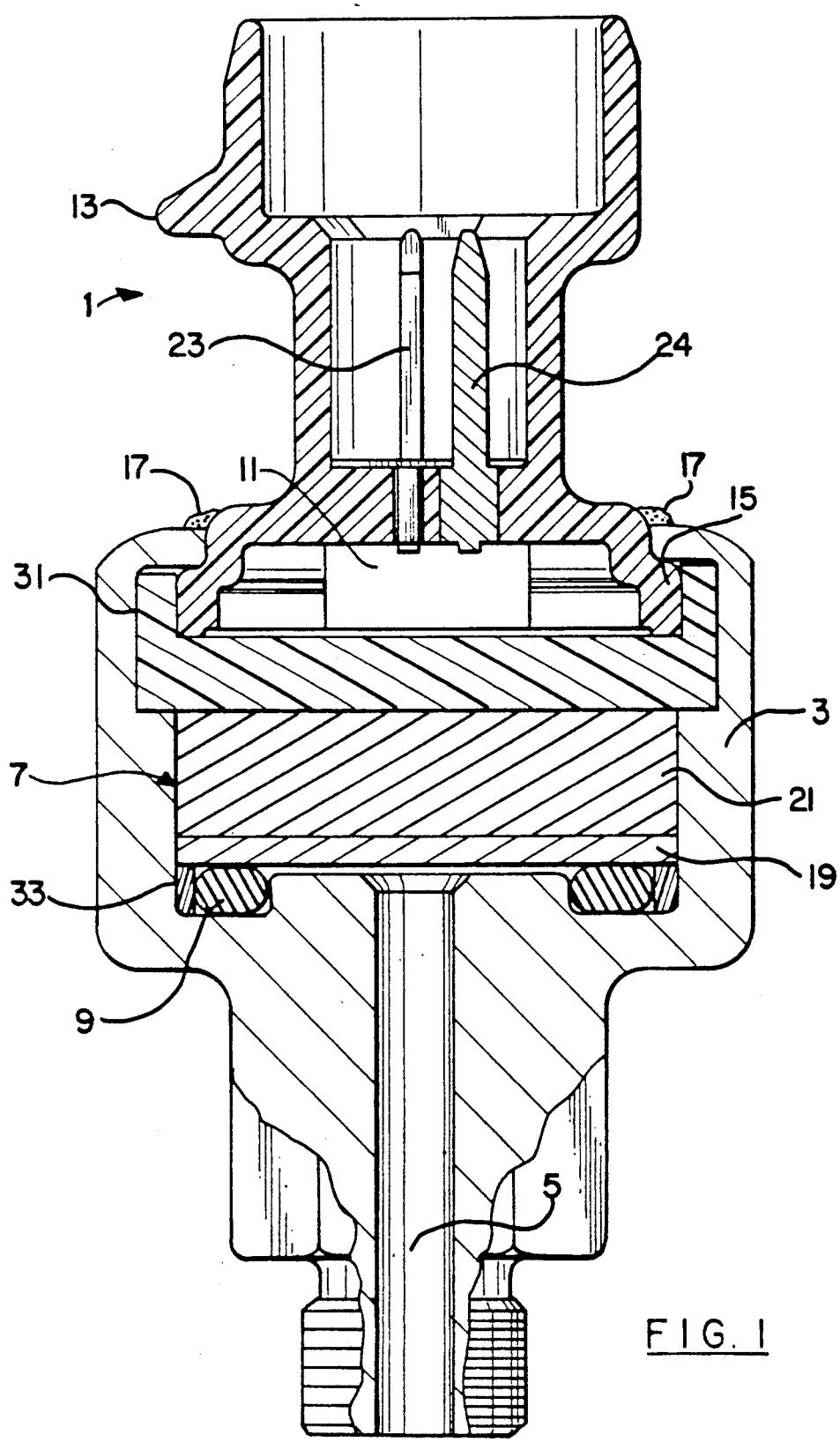
FIG. 1 is a cross sectional view of a high pressure transducer package in accordance with the above noted application.

Referring first to FIG. 1, there is shown a high pressure transducer package 1 in accordance with one embodiment of the above noted application. The package includes an outer metal can or cap 3 having a pressure inlet 5 at one surface thereof and a pressure sensing module 7 within the can separated from the inlet by a rigid back-up ring 33 and a less rigid O-ring 9 to prevent the O-ring from movement between the sensing element 7 and the can 3. Electronic circuitry 11 is positioned in contact with the module 7 and is otherwise surrounded by a plastic electrical connector 13 having a flange portion 15 over which the can 3 is crimped. An environmental sealant 17 is positioned at the junction of the can 3 and the connector 13 to prevent contaminants from travelling between the can and connector to the electronic circuitry 11. Three terminals 23, 24 and one not shown extend outwardly at the rear of the connector and are connected to the electronic circuitry to provide an output therefrom. The pressure sensing module 7 is composed of a pair of ceramic layers 19 and 21 which are spaced from each other, each layer having an electrically conductive coating thereon on opposing surfaces to form a capacitor. The layer 19 receives the force of fluid entering the pressure inlet 5 thereon and, operating as a diaphragm, varies the distance between electrically conductive coatings forming the capacitor to vary the capacitance of the capacitor as a function of applied pressure. A support ring 31, capable of withstanding pressures in the range of up to about 5000 psi is disposed between the pressure sensing module 7 and the electrical connector 13 to isolate the electrical connector and the electronic circuitry 11 from the high pressure applied at the pressure inlet 5. The can 3 is crimped over both the support ring 31 as well as the flange 15 of the connector 13.

Figure 2:
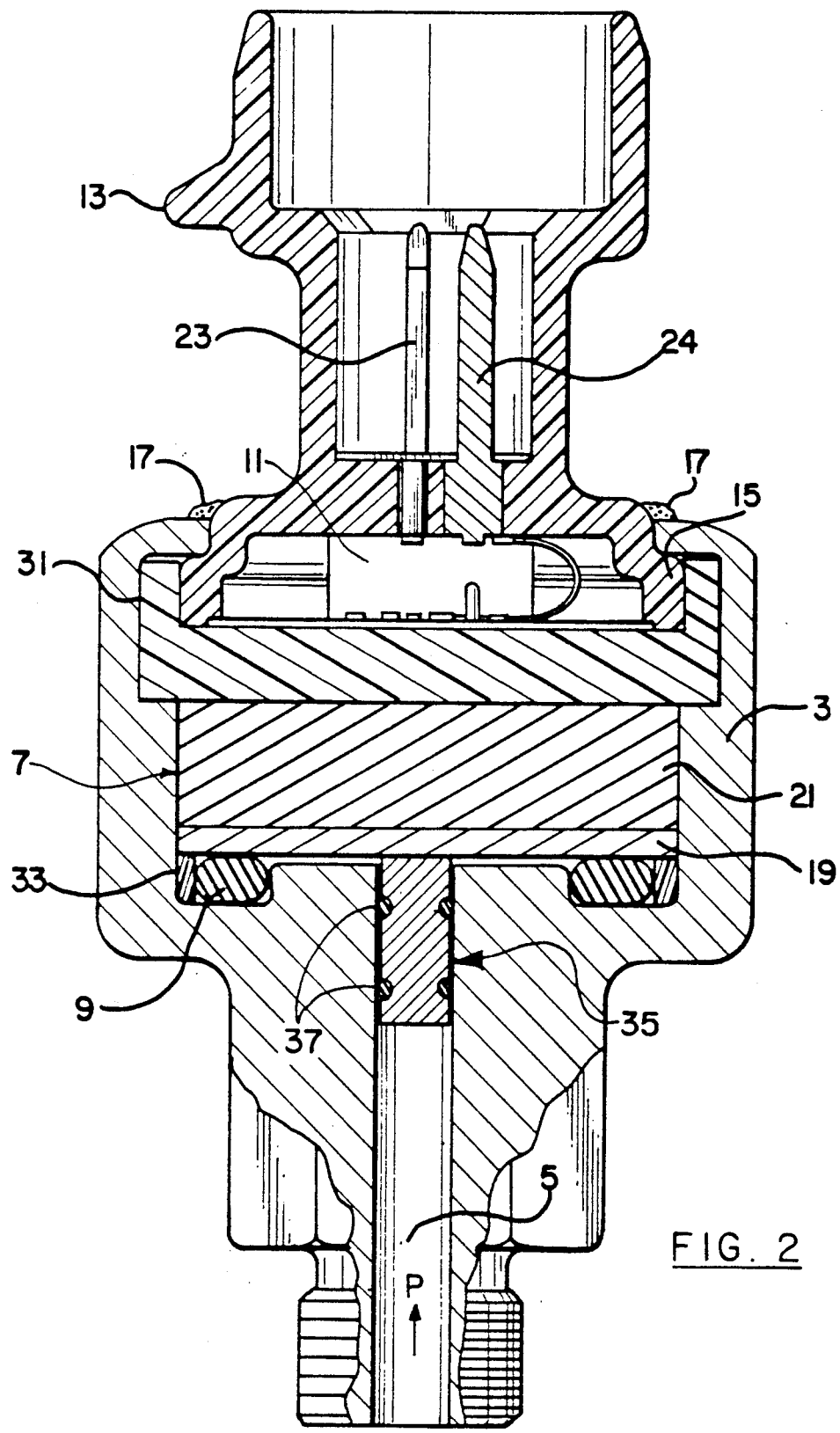
FIG. 2 is a cross sectional view of a high pressure transducer package in accordance with a first embodiment of the present invention.

Referring now to FIG. 2, there is shown a first embodiment of a system in accordance with the present invention for minimizing the pressures encountered at the interior of the transducer package. In all instances herein, like numbers represent the same or similar elements. Accordingly, as can be seen with respect to FIG. 2, the transducer package is identical to that of FIG. 1, except that there is provided a solid or transfer pin 35 slidably movable in the fluid inlet 5 wherein the total inlet pressure is applied against one end of the pin. The other end of the pin 35 impinges against the pressure sensing element 19 to transfer the pressure in the inlet fluid thereto. The transfer pin 35 may include two or more sets of grooves in which are positioned O-rings 37 with or without back-up rings to seal the interior of the package from the fluid inlet 5. As an alternative, not shown, a vent to the package exterior can be provided in place of the O-rings 37 or in addition thereto to vent inlet fluid which bypasses the exterior surface of the piston 35 from entering the package interior. However, since the inlet fluid does not reach the interior of the package, no pressure or stress therefrom is applied to the package or sealing elements within the package. The stresses applied to the package elements are reduced and result only from the force applied by the piston or transfer pin on the pressure sensing element. If desired, the space between the piston 35 and the layer 19 can be filled with a fluid to provide lubrication and thereby reduce hysteresis.

Figure 3:
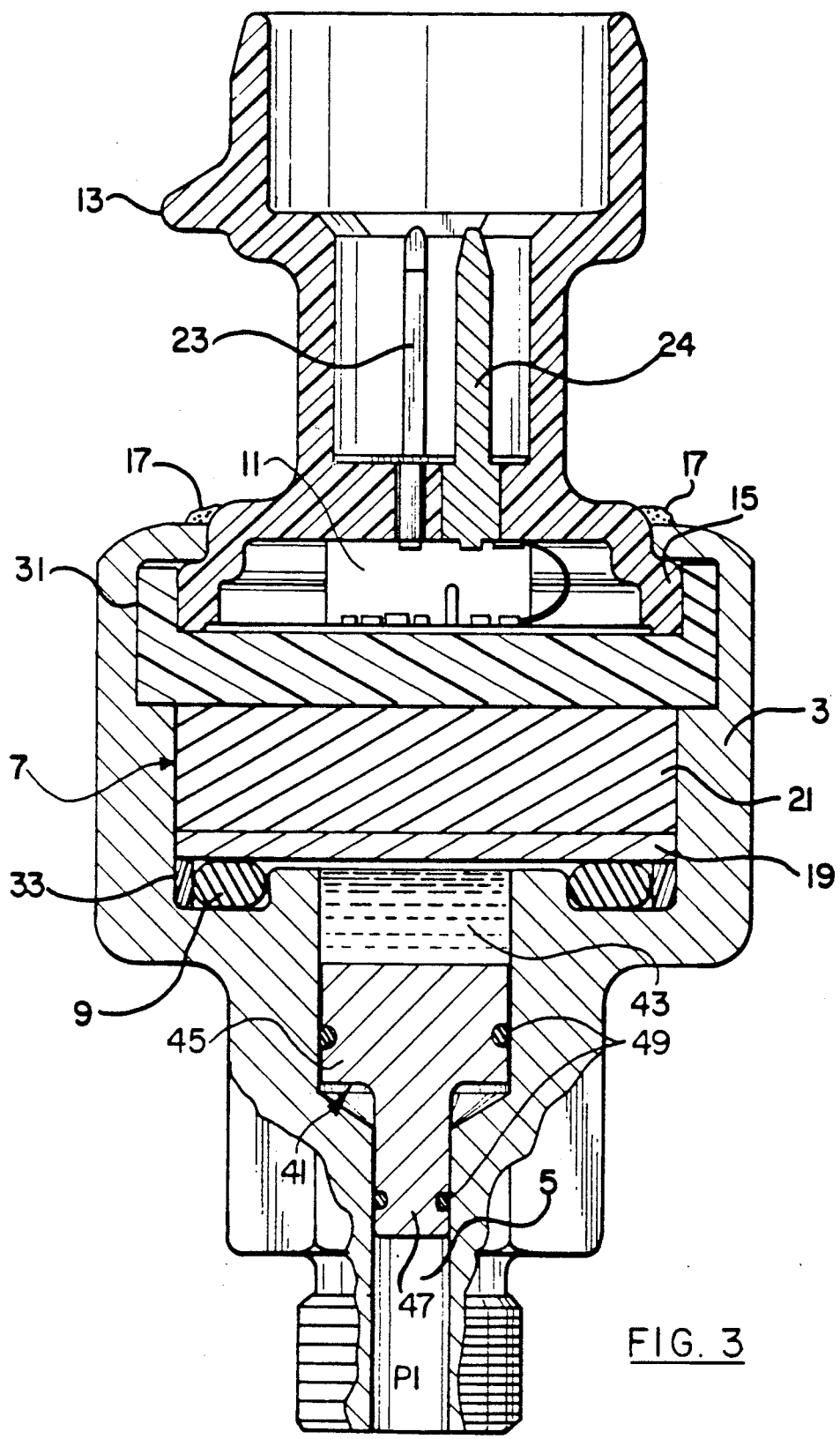
FIG. 3 is a cross sectional view of a high pressure transducer package in accordance with a second embodiment of the present invention.

With reference to FIG. 3, there is shown a second embodiment of the invention, wherein, again, a piston or transfer pin 41 is placed in the fluid inlet 5 whereby the inlet fluid impinges against one end thereof. This pressure is transferred to the pressure transducer layer 19 either as in the first embodiment or via a liquid 43 disposed in a pressure cavity between the opposing end of the piston 41 and the pressure transducer layer 19. In addition, the piston 41 in this embodiment has a larger diameter portion 45 at the end thereof contacting either the pressure transducer layer 19 or the liquid 43 than at the end 47 contacting the inlet fluid. This causes a reduction in the pressure applied to the pressure transducer since the pressure is applied over a larger area. The liquid provides for uniform application of the pressure from the piston to the pressure transducer along the entire area of contact therewith. As can be seen in FIG. 3, O-rings 49 with or without back-up rings are provided in grooves in the piston 51 as in the embodiment of FIG. 2 for the same reason.

Figure 4:
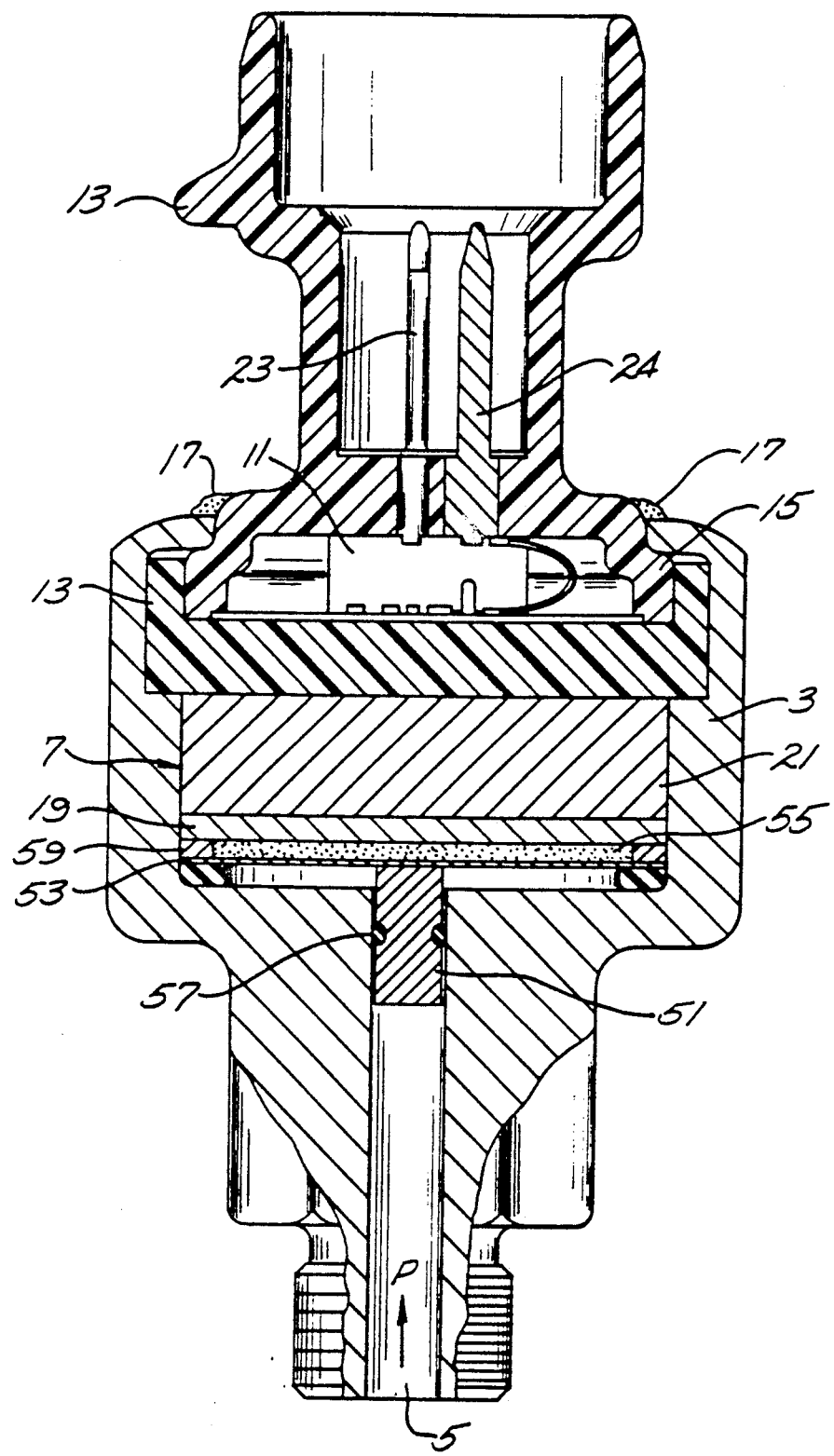
FIG. 4 is a cross sectional view of a high pressure transducer package in accordance with a third embodiment of the present invention.

With reference to FIG. 4, there is shown a third embodiment of the invention wherein a constant diameter piston or transfer pin 51 is placed in the fluid inlet 5 with inlet fluid impinging on one end thereof. The other end of the piston is placed against a thin metal diaphragm 53 having a substantially larger surface area than either end of the piston. A silicone gel, elastomer or other flowable material 55 which is unaffected by the pressures involved is positioned between the diaphragm 53 and the pressure transducer layer 19 and is maintained between the diaphragm and the layer 19 by a back-up ring 59 of rigid material, such as, for example, polytetrafluoroethylene or of a non-rigid seal material. In this manner, the pressures encountered within the package 1 are materially lower than the pressure at the package inlet, the flowable material 55 providing for uniform application of the pressure from the diaphragm 53 along the entire area thereof. Again, one or more O-rings 57 are provided for the same reasons as discussed above with reference to FIGS. 2 and 3.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A pressure transducer and package which comprises, in combination:
   (a) a housing having a high pressure fluid inlet;
   (b) a pressure sensing element disposed within said housing; and
   (c) a solid piston disposed in said fluid inlet and slidably movable within said inlet against said pressure sensing element isolating said inlet from said pressure sensing element.

2. A pressure transducer and package as set forth in claim 1 wherein said piston includes at least one annular groove on the surface thereof coaxial with the axis of said piston and one of an O-ring or an O-ring and back-up ring disposed in said groove.

3. A pressure transducer and package as set forth in claim 2 wherein the area of the surface of said piston communicating with the entrance to said fluid inlet is smaller than the area of the surface of said piston remote from said fluid inlet.

4. A pressure transducer and package as set forth in claim 3 further including a liquid pressure transferring medium disposed between said pressure sensing element and said surface of said piston remote from said fluid inlet.

5. A pressure transducer and package as set forth in claim 1 wherein the area of the surface of said piston communicating with the entrance to said fluid inlet is smaller than the area of the surface of said piston remote from said fluid inlet.

6. A pressure transducer and package as set forth in claim 5 further including a liquid pressure transferring medium disposed between said pressure sensing element and said surface of said piston remote from said fluid inlet.

7. A pressure transducer and package which comprises, in combination:
   (a) a housing having a high pressure fluid inlet;
   (b) a pressure sensing element disposed within said housing;
   (c) a piston disposed in said fluid inlet and movable within said inlet against said pressure sensing element isolating said inlet from said pressure sensing element; and
   (d) a diaphragm abutting the surface of said piston remote from the entrance to said fluid inlet and a liquid pressure transferring medium disposed between said diaphragm and said pressure sensing element.

8. A pressure transducer and package as set forth in claim 7 wherein said pressure transferring medium is taken from the class consisting of silicone gels and elastomers.

9. A pressure transducer and package as set forth in claim 8, further including one of a back-up ring or seal disposed between said diaphragm and said pressure sensing element containing said pressure transferring medium in a predetermined enclosure within said back-up ring or seal, said pressure sensing element and said diaphragm.

10. A pressure transducer and package as set forth in claim 7, further including one of a back-up ring or seal disposed between said diaphragm and said pressure sensing element containing said pressure transferring medium in a predetermined enclosure within said back-up ring or seal, said pressure sensing element and said diaphragm.

11. A pressure transducer and package which comprises, in combination;
   (a) a housing having a high pressure fluid inlet;
   a pressure sensing element disposed within said housing;
   (c) a piston disposed in said fluid inlet and movable within said inlet against said pressure sensing element isolating said inlet from said pressure sensing element, said piston including at least one annular groove on the surface thereof coaxial with the axis of said piston and one of an O-ring or an O-ring and back-up ring disposed in said groove; and
   (d) a diaphragm abutting the surface of said piston remove from the entrance to said fluid inlet and a liquid pressure transferring medium disposed between said diaphragm and said pressure sensing element.

12. A pressure transducer and package as set forth in claim 11 wherein said pressure transferring medium is taken from the class consisting of silicone gels and elastomers.

13. A pressure transducer and package as set forth in claim 12, further including one of a back-up ring or seal disposed between said diaphragm and said pressure sensing element containing said pressure transferring medium in a predetermined enclosure within said back-up ring or seal, said pressure sensing element and said diaphragm.

14. A pressure transducer and package as set forth in claim 11, further including one of a back-up ring or seal disposed between said diaphragm and said pressure sensing element containing said pressure transferring medium in a predetermined enclosure within said back-up ring or seal, said pressure sensing element and said diaphragm.

15. A pressure transducer and package which comprises, in combination:
   (a) a housing having a high pressure fluid inlet;
   (b) a pressure sensing element having an outer, pressure sensitive surface disposed within said housing;
   (c) a solid piston disposed in said fluid inlet and slidably movable within said inlet to transfer pressure from the high pressure fluid to the outer, pressure sensitive surface isolating said inlet from said pressure sensing element; and
   (d) a liquid pressure transferring medium disposed between said outer, pressure sensitive surface and said piston.

16. A pressure transducer and package as set forth in claim 15 wherein the area of the surface of said piston communicating with the entrance to said fluid inlet is smaller than the area of the surface of said piston remote from said fluid inlet.

17. A pressure transducer package as set forth in claim 15 further including a diaphragm abutting a surface of said piston remote from the entrance to said fluid inlet and a liquid pressure transferring medium disposed between said diaphragm and said pressure sensing element.

18. A pressure transducer and package as set forth in claim 15 wherein said pressure transferring medium is taken from the class consisting of silicone gels and elastomers.

19. A pressure transducer and package as set forth in claim 15 further including one of a back-up ring or seal disposed between said diaphragm and said pressure sensing element containing said pressure transferring medium in a predetermined enclosure within said back-up ring or seal, said pressure sensing element and said diaphragm.

* * * * *